US006616417B2

(12) United States Patent
Shen

(10) Patent No.: US 6,616,417 B2
(45) Date of Patent: Sep. 9, 2003

(54) SPATTER ION PUMP

(75) Inventor: Guo Hua Shen, Chigasaki (JP)

(73) Assignee: ULVAC, Inc., Kanagawa (JP)

( * ) Notice: Subject to any disclaimer, the term of this patent is extended or adjusted under 35 U.S.C. 154(b) by 0 days.

(21) Appl. No.: 09/959,879

(22) PCT Filed: Mar. 13, 2001

(86) PCT No.: PCT/JP01/01980

§ 371 (c)(1),
(2), (4) Date: Nov. 9, 2001

(87) PCT Pub. No.: WO01/69645

PCT Pub. Date: Sep. 20, 2001

(65) Prior Publication Data

US 2002/0159891 A1 Oct. 31, 2002

(30) Foreign Application Priority Data

Mar. 13, 2000 (JP) ....................................... 2000-069550
Mar. 13, 2001 (JP) ....................................... 2001-070910

(51) Int. Cl.[7] ......................... H02K 44/00; H02K 44/08
(52) U.S. Cl. ................................ 417/50; 417/48; 313/7
(58) Field of Search ............................. 417/48, 49, 50; 313/7, 336

(56) References Cited

U.S. PATENT DOCUMENTS 2,983,433 A * 5/1961 Lloyd et al. .................. 230/69
3,228,589 A * 1/1966 Kearns ........................ 230/69
3,428,241 A * 2/1969 Eder ........................... 230/69
4,397,611 A * 8/1983 Wiesner et al. ............... 417/49
5,021,702 A * 6/1991 Miyoshi et al. ................ 313/7
5,980,212 A * 11/1999 Shen et al. ................... 417/49

FOREIGN PATENT DOCUMENTS

JP 11-354071 A * 12/1999

* cited by examiner

*Primary Examiner*—Cheryl J. Tyler
*Assistant Examiner*—Han L Liu
(74) *Attorney, Agent, or Firm*—Larson & Taylor PLC

(57) ABSTRACT

The sputter ion pump includes a vacuum chamber that includes an inner wall having a cylindrical section which is rugged in cross section. The rugged cylindrical section has outer recesses each of which is provided with a permanent magnets, each magnet having a same shape and a same characteristic so that a magnetic pole is directed to a same direction. The rugged cylindrical section has also inner recesses each of which is provided with a cylindrical anode electrode member spaced from the vacuum chamber wall. The rugged cylindrical section of the vacuum chamber wall is formed as a cathode electrode. A cylindrical shield member having a peripheral portion provided with evacuating bores is provided coaxially to the permanent magnets and anode electrodes. The permanent magnets and anode electrode members are arranged with equal spacing in an axis symmetrical configuration.

9 Claims, 3 Drawing Sheets

SPATTER ION PUMP

TECHNICAL FIELD

The present invention relates to a sputter ion pump that may be used for evacuating a space through which electron beams pass for example in an electron microscopy or an accelerator.

BACKGROUND ART

It is known that such a sputter ion pump comprises an anode electrode and a cathode electrode arranged within a vacuum chamber. High voltage is applied between the anode and cathode electrodes so that residual gas molecules to be evacuated are collided with electrons that are spirally moving by means of electromagnetic field, and thus are ionized. The cathode electrode is subjected to a sputtering by means of the ionized molecules to activate the surfaces thereof. Gas molecules are adsorbed on or embedded in the activated surfaces of the cathode electrode, or gas molecules are caught by the surfaces of the anode electrode, thereby performing an evacuation of gases.

One example of such conventional sputter ion pumps is disclosed in Japanese UM Publication No. 3-48838. The disclosed ion pump is applied for an electron microscopy in that two annular magnets are provided on a yoke member in such a manner that ion adsorption cells having an anode function are arranged between the annular magnets. Magnetic pole pieces are arranged on a magnetic circuit of a leakage magnetic flux of the annular magnets so that almost all of the leakage magnetic flux in a direction of a central aids pass through the magnetic pole piece thereby capable of concentrating the leakage magnetic flux.

Japanese Patent Publication No. 7-59943 discloses another conventional sputter ion pump in that two annular cathode electrodes are oppositely arranged between which an annular anode electrode is sandwiched, the annular anode electrode comprising a plurality of combined cylindrical bodies which are disposed in a cylindrical vacuum chamber. Outside of the vacuum chamber two annular permanent magnets are arranged so as to sandwich the vacuum chamber therebetween. Each of the permanent magnets has a shape corresponding to the annular cathode electrode and the annular anode electrode.

With these conventional sputter ion pumps, two annular permanent magnets are arranged to sandwich the annular anode electrode, significant magnetic field is formed in parallel to the central axis. With regard to radial magnetic field perpendicular to the central axis, the radial magnet field on the central axis becomes zero if said two annular permanent magnets have same size and same characteristic. Significant large magnetic field is formed in an area where is near to the central axis (for example, the position of 0.5 to 1 mm from the central a). However, the radial magnet field on the central axis does not become zero but is significantly large due to an unevenness in the characteristics of the magnets.

The arrangement disclosed in Japanese UM Publication No. 3-48838 has a disadvantage that the pump itself has a heavy weight due to the provision of a yoke circuit.

In addition, there is another disadvantage that the leakage magnetic field is larger to have an adverse effect to a beam deflection. That is, if the leakage magnetic field becomes larger, electron beams in the accelerator or the electron microscopy are to be deflected and thus an electron image becomes dim and a current value of the electron beam is reduced. In particular, with the arrangement disclosed in the above mentioned Japanese Patent Publication No. 7-59943 that no yoke member is provided, the magnetic field induced from the permanent magnetic field has an adverse effect to neighboring measuring instruments.

Furthermore, in view of a pump performance it is important that the surface area of the respective members or parts built in a vacuum chamber is as small as possible for attaining an ultra-high vacuum (UHV). In the conventional sputter ion pump mentioned above, however, the cathode electrode and the inner wall of the vacuum chamber have relatively larger surface area, and the amount of gas discharged from these portions is relatively larger. Therefore, the ultimate pressure of a pump is to be restricted

DISCLOSURE OF THE INVENTION

Therefore, the present invention has an object to overcome the above mention disadvantages involved in the prior arts and to provide a sputter ion pump that it has a simple structure, a size and a weight can be reduced, the magnetic fields in the vicinity of a central axis can be nullified in the both of a radial and axial directions, and ultimate pressure of the pump can be increased.

In order to attain the above mentioned object, according to the sputter ion pump of the present invention a vacuum chamber includes an inner wall having a tubular or annular section where is formed to be rugged in a cross section to define outer recesses and inner recesses. The outer recesses of the rugged tubular section are intended to receive permanent magnets each of which has a same shape and a same characteristic and arranged so that a magnetic pole is directed to a same direction. The inner recesses are provided with anode electrode members spaced from the vacuum chamber wall. The rugged tubular section of the vacuum chamber wall is formed as a cathode electrode. A cylindrical shield member having a peripheral portion provided with evacuating bores is provided coaxially to the permanent magnets and anode electrode members, the permanent magnets and anode electrodes being arranged with equal spacing in a configuration symmetrical against the center axis.

Each of the permanent magnets arranged in the respective outer recesses of the tubular section may be formed as a wedge-shaped polygonal or circular column having an outwardly spread configuration in a cross section perpendicular to the central axis of the vacuum chamber.

Each of the anode electrode members arranged in the respective inner recesses of the cylindrical section may be formed as a wedge-shaped circular or polygonal tubular body having an outwardly spread configuration in a cross section in a direction perpendicular to the central axis of the vacuum chamber.

The outer recesses and the inner recesses of the cylindrical section of the vacuum chamber may be arranged alternately, and the permanent magnets and the anode electrode members may be arranged alternately.

Preferably, the peripheral portion of the vacuum chamber having the recesses in which the permanent magnets and the anode electrode members are arranged and the magnetic shield member may be cylindrical. The permanent magnets and the anode electrode members may be arranged symmetrically against the center axis on a substantial same circumference.

PREFERRED EMBODIMENTS OF THE INVENTION

The embodiments of the present invention will now be described with reference to the drawings.

Figure 1:
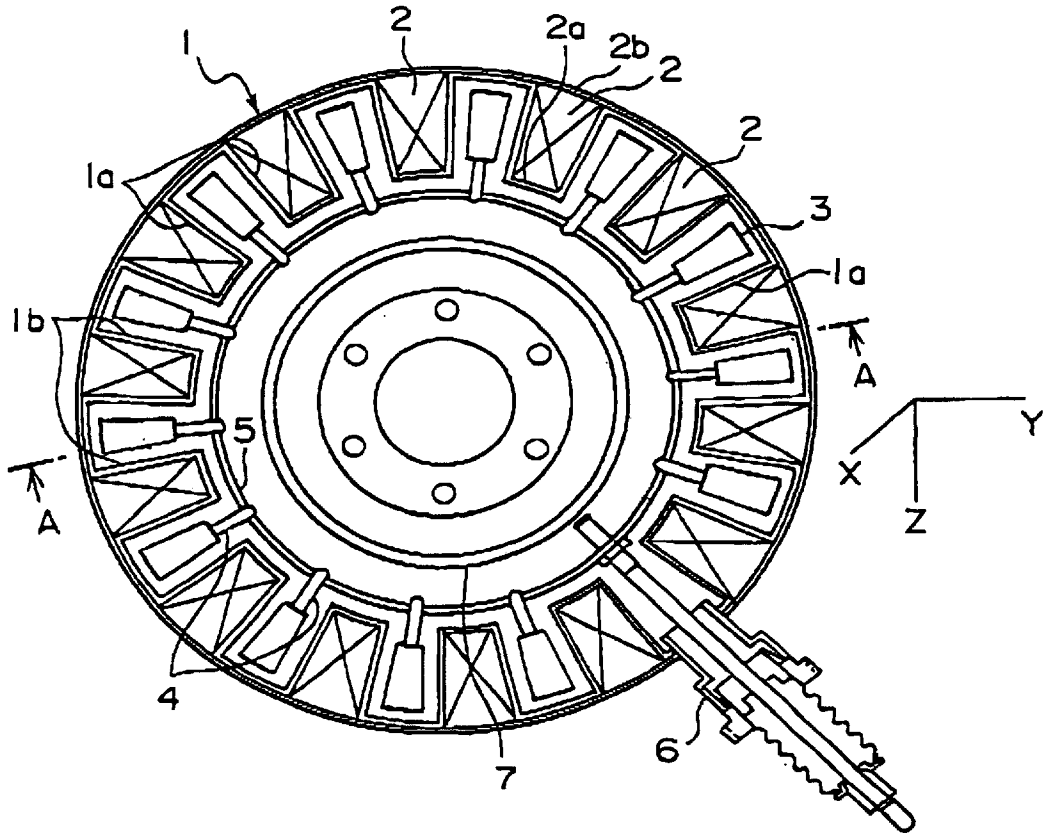
FIG. 1 is a schematic cross sectional view showing one embodiment of a sputter ion pump according to the present invention.
Figure 2:
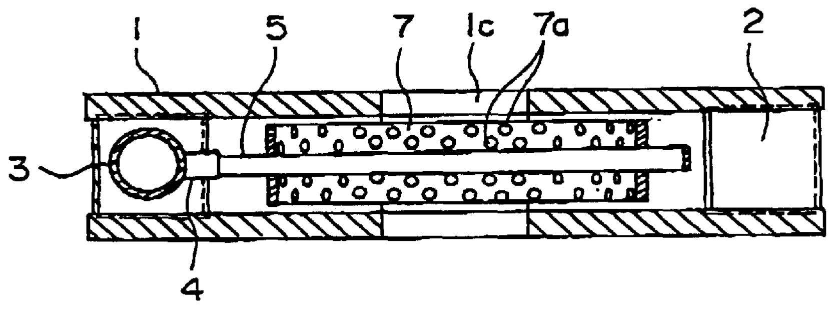
FIG. 2 is a schematic longitudinal section taken along the arrows A—A in FIG. 1.

FIGS. 1 and 2 illustrate one embodiment of the sputter ion pump according to the present invention. In these drawings, reference numeral 1 denotes a vacuum chamber having a peripheral portion that is rugged so that outer recesses 1*a* and inner recesses 1*b* are defined alternately. The vacuum chamber 1 is made of titanium (Ti). The peripheral portion of the vacuum chamber 1 is intended to serve as a cathode electrode.

Figure 3:
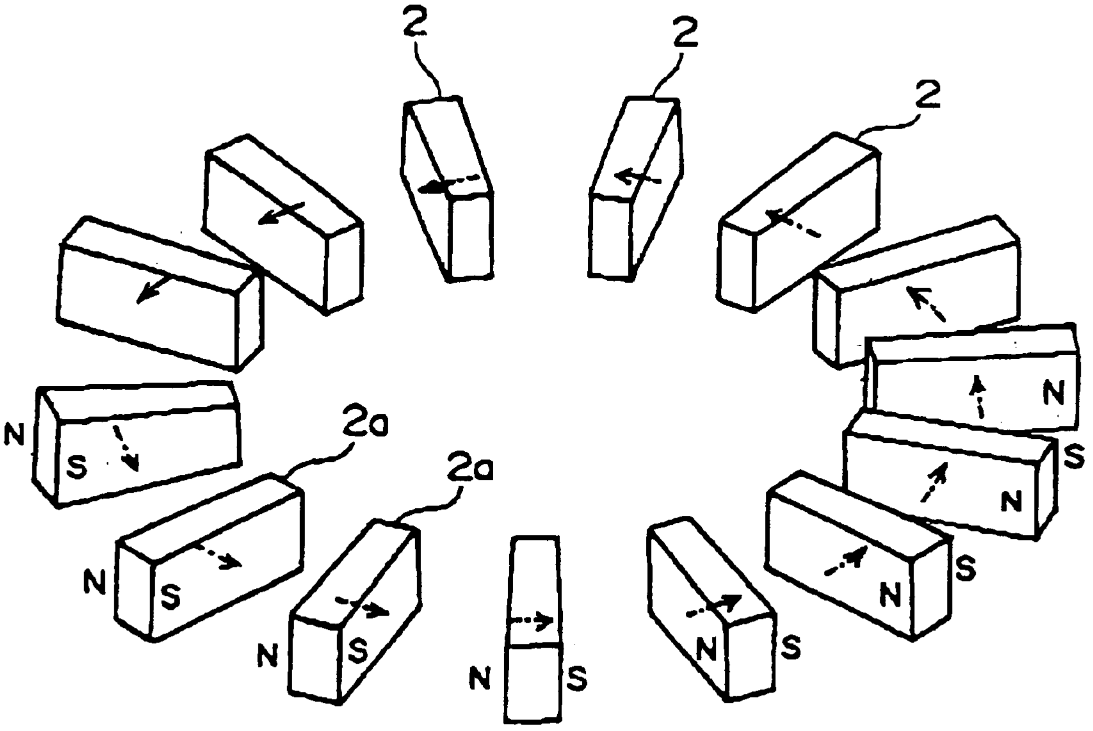
FIG. 3 is a schematic perspective view showing an arrangement of permanent magnets in the sputter ion pump shown in FIG. 1.

A plurality of permanent magnets 2 are disposed in a symmetrical configuration to a center axis at a same circumference within the outer recesses 1*a* of the peripheral portion. Each of the permanent magnets 2 is formed as a wedge-shaped column having an outwardly spread configuration in a cross section perpendicular to the central axis of the vacuum chamber 1. That is, each of the permanent magnets 2 has an inner peripheral side 2*a* and an outer peripheral side 2*b* that is longer than the inner peripheral side 2*a* The respective permanent magnets have an identical shape and characteristic. As shown in FIG. 3, also, these magnets 2 are arranged so that they have a same magnetic pole direction, or a N pole in one of the permanent magnets 2 is faced to a S pole in the adjacent permanent magnet 2.

Within the inner recesses 1*b* of the peripheral portion of the vacuum chamber 1, a plurality of cylindrical anode electrode members 3 are arranged on a same circumference and spaced from the wall of the vacuum chamber 1 as shown in FIG. 3. The respective anode electrode members 3 are made of electrical conductive material. Each anode electrode member 3 has an opening directed to the circumferential direction. Each anode electrode member 3 comprises a wedge-shaped cylinder body having an profile spread in a direction from the central axis of the vacuum chamber 1 to the outer peripheral portion. The respective anode electrode members 3 are designed to have an identical shape and characteristic. These anode electrode members 3 are connected by an electrical conductive support member 4 to a common annular member 5. The annular member 5 is connected to a high voltage terminal 6.

Figure 4:
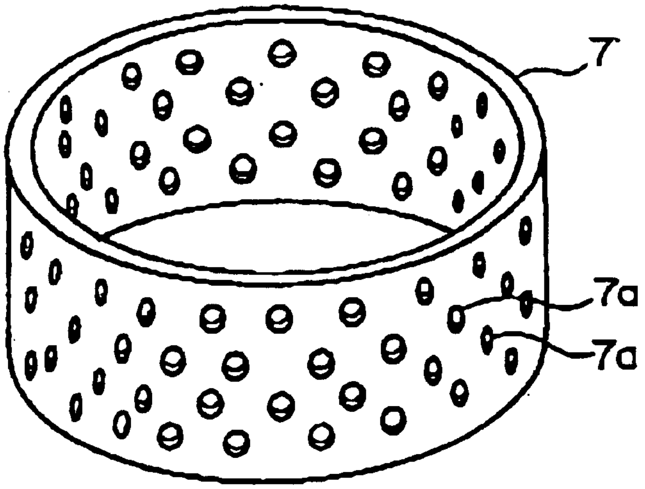
FIG. 4 is a schematic perspective view showing a circular magnetic shield member in the sputter ion pump shown in FIG. 1.
Figure 5:
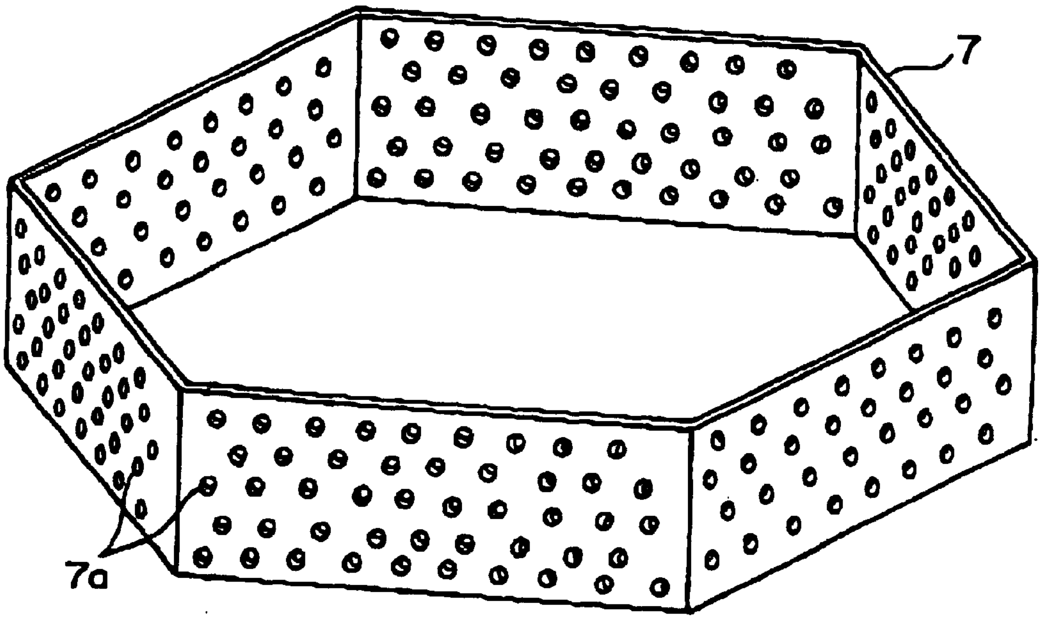
FIG. 5 is a schematic perspective view showing a hexagonal magnetic shield member in the sputter ion pump shown in FIG. 1.

Cylindrical magnetic shield 7 is made of any suitable magnetic material and is coaxially provided in a vacuum zone defined inside of the annularly arranged anode electrode members 3. This cylindrical magnetic shield 7 is provided with a plurality of exhaust openings 7*a* as illustrated in FIG. 4.

With the illustrated sputter ion pump thus constructed, when the pump is to be used, for example an electron gun (not shown) of the electron microscope is mounted on the central opening 1*c* of the pump. The operation of the illustrated sputter ion pump will now be described.

By the axial symmetrical arrangement of the permanent magnets 2 at the same circumference in the outer recesses 1*a* of the peripheral portion of the vacuum chamber 1, the generated magnetic force lines are converged without any diverging; Consequently, a stronger magnetic field is produced between magnetic pole surfaces of the permanent magnets 2 while the magnetic field at other zones is weaker. Therefore, there is a little leakage magnetic field. For ample, if fourteen permanent magnets are arranged on a circumference in a diameter of 140 mm, the magnetic filed at the position outwardly away from the outer portions of these permanent magnets by 10 cm was strength of 0.1 oersted. Leakage magnetic field in space at the position inwardly away from the inner portions of the permanent magnets by 3 cm (i.e. at the position away from the central axis by 80 nm) was 1 oersted. Particularly, the magnetic field at the zone ranging from the central axis to the position away from the central axis by 30 mm was $10^{-3}$ oersted.

Furthermore, a magnetic field that is required for a discharging space in the sputter ion pump becomes uniform. That is, in the sputter ion pump according to the present invention the permanent magnets 2 are disposed at the same circumference in an axial symmetrical configuration. The inner peripheral side 2*a* in each permanent magnet 2 is designed to have a width smaller than that of the outer peripheral side 2*b*. Therefore, a uniform magnetic field can be produced in the region defined between the adjacent permanent magnets 2.

In the sputter ion pump according to the present invention if the permanent magnets 2 to be used have a uniform magnetic characteristic and they arranged at regular intervals, the magnetic field in the vicinity of the central axis can be nullified without providing the magnetic shield 7. In case the magnetic characteristic of the magnets 2 to be used have a dispersion of t 10% and the magnets 2 are arranged with a dispersion of ±5%, a magnetic field of 0.5 oersted in the vicinity of the center axis was measured with the magnetic shield 7. A magnetic field of 3–4 oersted was measured in the vicinity of the center axis without the magnetic shield 7.

In the illustrated embodiment, each of the permanent magnets 2 is of a wedge-shaped column having an outwardly spread cross section perpendicular to the axis direction. It is without saying that the permanent magnet 2 may be formed as a column of other shapes such as a polygonal shape or a circular shape in a cross section.

With regard to the anode electrode members 3, instead of a cylindrical shape they may be formed to have a polygonal cylinder shape. Also, the magnetic shield 7 may be formed as a polygonal cylinder shape instead of the cylindrical shape. Furthermore, the vacuum chamber 1 may be formed as a regular polygonal shape instead of a cylindrical one.

As described in the above, in the sputter ion pump according to present invention, a vacuum chamber includes an inner wall having a cylindrical section where is formed to be rugged in a cross section, the rugged cylindrical section has outer recesses within which permanent magnets each having a same shape and a same characteristic are provided so that a magnetic pole is directed to a same direction, the rugged cylindrical section has inner recesses within which cylindrical anode electrode members are provided spaced from the vacuum chamber wall, and the rugged cylindrical section of the vacuum chamber wall is formed as a cathode electrode. Therefore, the sputter ion pump according to the present invention has an advantage that not only the arrangement can be simplified but also a size and a weight can be reduced as compared with the conventional sputter ion pumps in which a cathode electrode is separately provided, or a yoke member is provided.

Even if the characteristic and arrangement of the permanent magnets practically used have some deviation, the magnetic filed in the center axis direction in the sputter ion pump according to the present invention has a small or only a few oersted. On the contrary, the conventional arrangement has a magnetic field of several tens oersted in a center axis direction under the same condition. Therefore, effective shielding can be obtained by means of the cylindrical magnetic shield provided in the vacuum chamber. Consequently, in case the sputter ion pump according to the present invention is used for an accelerator or an electron microscope, an electron beam in the accelerator or the electron microscope is not subjected to any influence of leakage magnetic field. Therefore, there are not induced problems that an electron image becomes dim and the current value of the electron beam is decreased.

Furthermore, in the sputter ion pump according to the present invention, the surface area of each of the components built in the vacuum chamber is smaller than that of the conventional arrangement, and thus the amount of gas discharged therefrom can be relatively reduced or suppressed. Therefore, the ultimate pressure of the pump can be increased.

What is claimed is:

1. A sputter ion pump comprising an anode electrode and a cathode electrode arranged within a vacuum chamber, in which said vacuum chamber high voltage is applied between the anode and cathode electrode so that (a) electrons are spirally moved by means of a magnetic field, (b) residual gas molecules in the vacuum chamber are collided with electrons that are spirally moving and are ionized, (c) the ionized molecules sputter the cathode electrode to activate surfaces thereof, and (d) thus the surfaces of the cathode electrode which are activated and surfaces of the anode electrode adsorb or catch the gas molecules, thereby performing an evacuation, wherein (a) the vacuum chamber includes an inner wall having a cylindrical section which is formed to be rugged in a cross section to define outer recesses and inner recesses and to form the cathode electrode, (b) said outer recesses of the rugged cylindrical section contain a plurality of permanent magnets each having an identical shape and characteristic with their magnetic poles being directed to a same direction, (c) said inner recesses of the rugged cylindrical section contain a plurality of cylindrical anode electrode members paced from the vacuum chamber inner wall, the permanent magnets and the anode electrode members are arranged with equal spacing in a symmetrical configuration against a center axis of the pump, and (d) a cylindrical shield member having a peripheral portion provided with evacuating bores is provided coaxially to the permanent magnets and anode electrode members.

2. The sputter ion pump as claimed in claim 1, wherein each of the permanent magnets arranged in the respective outer recesses of the cylindrical section comprises a wedge-shaped column having an outwardly spread configuration in a cross section perpendicular to the central axis of the vacuum chamber.

3. The sputter ion pump as claimed in claim 1, wherein each of the permanent magnets arranged in the respective outer recesses of the cylindrical section comprises a wedge-shaped polygonal column having an outwardly spread configuration in a cross section perpendicular to the central axis of the vacuum chamber.

4. The sputter ion pump as claimed in claim 1, wherein each of the permanent magnets arranged in the respective outer recesses of the cylindrical section comprises a wedge-shaped circular column having an outwardly spread configuration in a cross section perpendicular to the central axis of the vacuum chamber.

5. The sputter ion pump as claimed in claim 1, wherein each of the anode electrode members arranged in the respective inner recesses of the cylindrical section comprises a wedge-shaped tubular body having an outwardly spread cross section in a direction perpendicular to the central axis of the vacuum chamber.

6. The sputter ion pump as claimed in claim 1, wherein each of the anode electrode members arranged in the respective inner recesses of the cylindrical section comprises a wedge-shaped polygonal tubular body having an outwardly spread cross section in a direction perpendicular to the central axis of the vacuum chamber.

7. The sputter ion pump as claimed in claim 1, wherein the outer recesses and the inner recesses of the cylindrical section of the vacuum chamber are arranged alternately, and the permanent magnets and the anode electrode members are arranged alternately.

8. The sputter ion pump as claimed in claim 1, wherein the peripheral portion of the vacuum chamber having the recesses in which the permanent magnets and the anode electrode members are arranged and the magnetic shield member are cylindrical, and the permanent magnets and the anode electrode members are arranged symmetrically against the center axis of the pump on a substantial same circumference.

9. The sputter ion pump as claimed in claim 1, wherein the shield member disposed in the vacuum chamber comprises a polygonal tubular body.

* * * * *